United States Patent [19]

Blome et al.

[11] 3,935,060

[45] Jan. 27, 1976

[54] FIBROUS INSULATION AND PROCESS FOR MAKING THE SAME

[75] Inventors: James C. Blome, Bridgeton, Mo.; Chris J. Goodbrake, Vandalia, Ill.; Marvin Edward O'Brien, Jackson, Miss.; Macy W. Vance, St. Louis, Mo.

[73] Assignee: McDonnell Douglas Corporation, St. Louis, Mo.

[22] Filed: Oct. 25, 1973

[21] Appl. No.: 409,620

[52] U.S. Cl. ............... 162/152; 106/57; 106/65; 106/69; 162/145; 162/181 R; 162/181 C; 162/192; 162/225; 264/25; 264/66; 264/86; 264/87; 264/311
[51] Int. Cl.² ......................................... D21H 5/18
[58] Field of Search .......... 106/65, 69, 57; 161/168, 161/169, 170; 264/66, 25, 86, 87, 311; 162/152, 181 C, 181 R, 192, 221, 225, 224, 231, 145; 252/62

[56] References Cited
UNITED STATES PATENTS

| | | | |
|---|---|---|---|
| 2,731,359 | 1/1956 | Nicholson | 162/152 |
| 3,100,734 | 8/1963 | Rex et al. | 162/152 |
| 3,231,401 | 1/1966 | Price et al. | 106/57 |
| 3,253,978 | 5/1966 | Bodendorf et al. | 162/181 C |
| 3,423,216 | 1/1969 | Somers | 106/57 |
| 3,467,535 | 9/1969 | Myles | 252/62 |
| 3,510,323 | 5/1970 | Wismer et al. | 106/65 |
| 3,577,344 | 5/1971 | Ardary et al. | 252/62 |
| 3,629,116 | 12/1971 | Gartner et al. | 162/152 |
| 3,704,523 | 12/1972 | Guerga et al. | 34/1 |
| 3,732,048 | 5/1973 | Guerga et al. | 264/25 |

OTHER PUBLICATIONS

Casey J P "Pulp Paper" Vol. II. Sec. Ed. Interscience Publishers N. Y. N. Y., 1960 pp. 1004–1006.

*Primary Examiner*—S. Leon Bashore
*Assistant Examiner*—William F. Smith
*Attorney, Agent, or Firm*—Gravely, Lieder & Woodruff

[57] ABSTRACT

An insulative material comprises a random network of ceramic fibers and a binder for holding the fibers together. In addition, it may include a filler material composed of hollow ceramic spheres which locate at the interstices of the fibrous network and increase the strength of the network. The insulative material can withstand extremely high temperatures and thermal shock without degradation, has an extremely low density, has excellent insulating properties, and has reasonably high compressive strength. The material is formed by making a slurry which contains the ceramic fibers, with or without the filler, and the binder; felting the slurry; subjecting the felt so formed to microwave energy for drying; and firing the dried felt at 2300°–3200°F. to increase its strength.

8 Claims, 3 Drawing Figures

FIBROUS INSULATION AND PROCESS FOR MAKING THE SAME

BACKGROUND OF THE INVENTION

This invention relates in general to refractory materials and more particularly to a high temperature insulation of a fibrous nature.

Many refractory materials are quite heavy and as a result are unsuitable for aerospace applications. Where they are used, they are often difficult to handle and large foundation structures are usually required. Moreover, most of these heavy refractory materials cannot withstand thermal shock, that is, rapid variations in temperature, for when subjected to rapid temperature variations, tend to crack and spall. Firebrick is an example of such a refractory material.

Due to the foregoing limitations aerospace engineers have turned to so-called ablative materials where extremely high temperatures are encountered, such as during the re-entry of a space craft into the earth's atmosphere. Ablators dissipate heat through pyrolysis and other modes of heat rejection and consequently degrade in use. Generally, ablative materials are used only once, and therefore such materials are not suitable where reuse of the heat shield is desired.

SUMMARY OF THE INVENTION

The present invention is embodied in an insulation material comprising ceramic fibers and a binder for holding the fibers together. It also includes the process for manufacturing the insulation involving making a slurry containing the fibers and binder, felting the slurry, subjecting the felt to microwave energy for drying, and firing the same for increased strength. The invention also consists in the parts and in the arrangements and combinations of parts hereinafter described and claimed.

One of the principal objects of the present invention is to provide a fibrous insulative material and a process for manufacturing the same. Another object is to provide a material of the type stated which is light in weight and self-supporting. A further object is to provide a material of the type stated which is capable of withstanding extremely high temperatures without decomposing or losing its strength. An additional object is to provide a material of the type stated which is reusable and is ideally suited for aerospace applications. Still another objective is to provide a material which is durable and dimensionally stable over a wide temperature range. Another object is to provide an insulation which may be bonded to a supporting structure without creating high strain at bondline interfaces, even when the temperature of the supporting structure and the insulation are quite different. Yet another object is to provide a simple process for making the insulation material, which utilizes readily available materials. These and other objects and advantages will become apparent hereinafter.

DESCRIPTION OF THE DRAWINGS

In the accompanying drawings which form part of the specification and wherein like numerals and letters refer to like parts wherever they occur.

DETAILED DESCRIPTION

Figure 1:
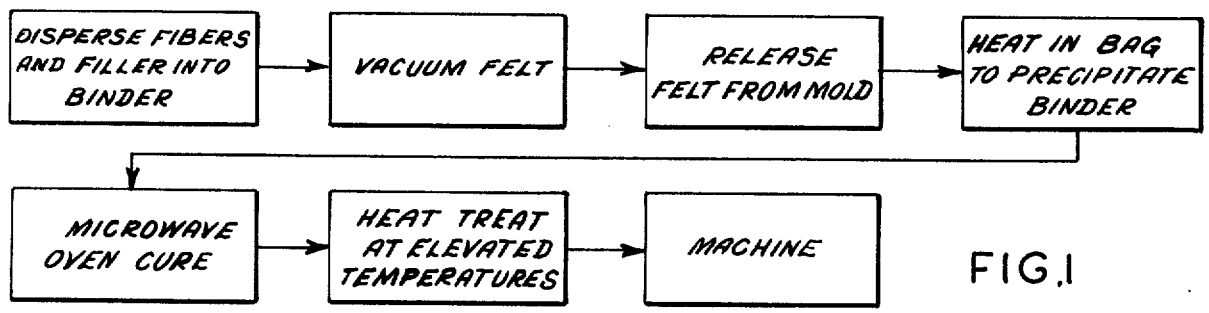
FIG. 1 is a flow chart showing the process used in making the insulation.
Figure 2:
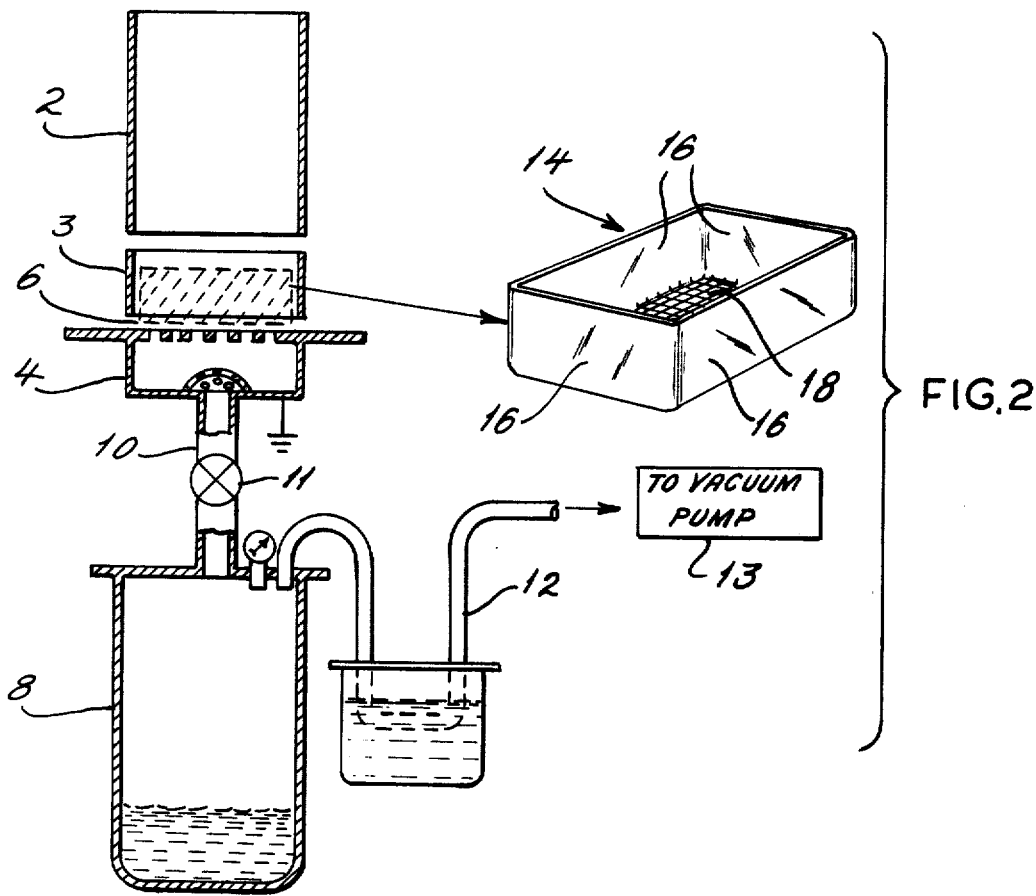
FIG. 2 is a schematic view showing equipment used in vacuum felting the slurry from which the insulation is derived.
Figure 3:
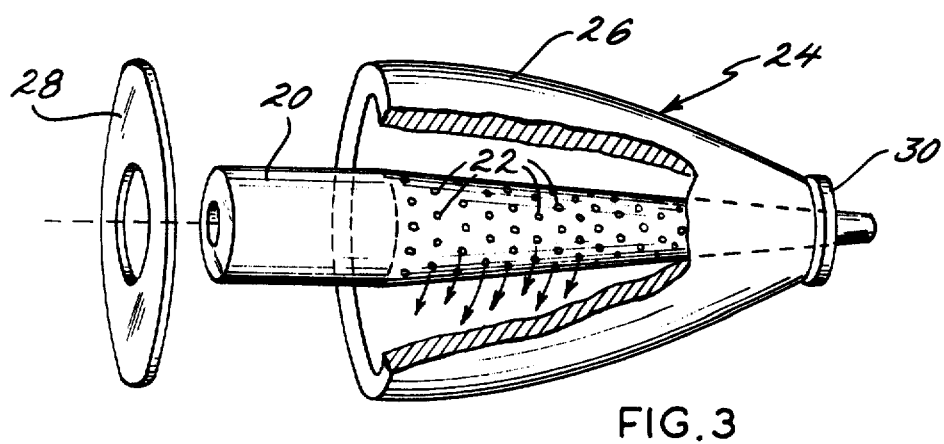
FIG. 3 is a schematic view showing equipment used to centrifugally felt the slurry as an alternative to vacuum felting.

Broadly speaking, this invention concerns a lightweight fibrous insulation comprised of inorganic ceramic fibers and a binder. The preferred embodiment of this invention includes light-weight ceramic fillers of a hollow spherical nature. The ceramic fibers are arranged in a semirandom network and thus produce a batting or matted form. The hollow spherical ceramic fillers occupy the interstices in the fibrous network and this tends to improve the overall strength of the insulation. The binder acts as a bonding agent and should be completely void of organic materials or possibly contain a relatively low proportion of such materials. The ceramic fibers should constitute 20% to 80% of the weight of the insulation and should preferably constitute about 50%. The fillers should constitute 0% to 50% of the weight of the insulation and should preferably be about 25%. The binder solids should constitute 10% to 40% of the total insulation weight and preferably should be 25%. The fibrous insulation is sometimes referred to as "hardened compacted fibers" or merely "HCF"

The inorganic ceramic fibers may be mullite fibers (3 $Al_2O_3 \cdot 2\ SiO_2$), aluminosilicate fibers ($Al_2O_3 \cdot SiO_2$, approximately), silica fibers ($SiO_2$), zirconia fibers ($ZrO_2$), or aluminosilicate chromia fibers (48% $Al_2O_3 \cdot$ 48% SiO $\cdot$ 4% $Cr_2O_3$, expressed as mole percentages). These materials are made into a fibrous matt which is wet felted and rigidizied with a ceramic binder and filler to large block type thermal insulation materials. Table I lists distinguishing properties of the different fibrous materials. The maximum use temperatures listed are conservative and for long time exposure.

The various fibrous insulations set forth in Table I contain the following ingredients:

| | |
|---|---|
| Fibrous Materials | Mullite, Aluminosilicate, Zirconia, Silica, Aluminosilicate + Chromia |
| Binder | -Colloidal Silica, Hydrolyzed Ethyl Silicate |
| Hollow spheres filler | -Silica Spheres, Aluminosilicate Spheres |

The materials were made by the process of Example No. 1.

TABLE I

| Type of HCF | VARIOUS TYPES OF HCF MATERIALS | | | | |
|---|---|---|---|---|---|
| | Mullite | Aluminosilicate | Zirconia | Silica | Aluminosilicate-Chromia |
| Maximum use Temperature(°F.) | 2300–2500 | 2000–2200 | 3100–3200 | 2000–2200 | 2200–2400 |
| Density (LBS./FT.³) 500° | 15 | 15 | 34 | 15 | 15 |
| Thermal Conductivity 1500° | 0.90 | 0.55 | 0.43 | 0.51 | 0.60 (EST) |

TABLE I-continued

| Type of HCF | VARIOUS TYPES OF HCF MATERIALS | | | | |
|---|---|---|---|---|---|
| | Mullite | Aluminosilicate | Zirconia | Silica | Aluminosilicate-Chromia |
| $\left(\dfrac{\text{BTU-IN}}{\text{FT.}^2\text{-HR-}°\text{F.}}\right)$ | 1.50 | 1.50 | 1.20 | 1.40 | 1.50 (EST) |

*MEAN TEMPERATURE (°F.)

The diameter of the fibers should be between about 2.5 microns and about 6.0 microns, with about 4.7 microns being preferred. The length of the fibers should range between about 0.002 inches and about 0.5 inches, approximately 20 times the diameter of the fiber.

The light-weight fillers should preferably be small hollow spheres ranging between 150 microns and 60 microns in diameter, although other granular configurations are also suitable. The filler may be composed of pure silica, or it may be a hollow sphere 95% silica product, sold under the trademark ECCOSPHERES,SI by Emerson-Cummings, Inc. It may also be hollow spheres of aluminosilicate zirconia material. Even glass spheres separated from common fly ash derived from the smoke stacks of coal burning utilities and the like may be utilized. The filler should preferably be spherical in nature and should be capable of withstanding high temperatures. It should further pass a 120 mesh screen, while 15% of it should pass a 230 mesh screen. While the filler improves the strength of the overall structure, it is not absolutely necessary.

The binder may be silica, which is an inorganic substance, and colloidal silica is ideally suited for use as the binder. However, it is not necessary that the binder ingredient be in the inorganic state throughout the processing operation. Indeed, the silica binder may be derived from hyrolyzed ethyl silicate. When the insulation is fired in the processing operation the organic components are driven off and only silica remains.

Furthermore, silicone binders having a low portion of inorganic constituents may be used, and when such binders are used the fibrous insulation not only possesses insulating properties, but also possesses ablative properties. When an insulation containing a silicone binder is heated to a high enough temperature the silicone binder is pyrolyzed, and is transformed into a silica. The transformation requires heat and hence some of the heat is dissipated in the conversion. The silicone binder is more resilient than ceramic binders, and thus the insulation is somewhat tougher with the silicone binder than with a pure silica binder. While the silicone binder imparts ablative qualities to the insulation, the insulation does not remain highly dependent upon pyrolysis for thermal control as do pure ablators. On the contrary, it is dependent primarily on the insulative effect created by the network of ceramic fibers. In any event, the insulation remains intact after the pyrolysis and thereafter functions as an insulation with a pure silica binder.

Thus, the binder need not be inorganic silica from the very outset, for it may be a substance which may decompose to silica under elevated temperatures or hydrolysis such as silicone or ethyl silicate. Nevertheless, the volatiles, including water, and/or organic compounds, should not exceed 75% of the total weight of the binder.

To manufacture the fibrous insulation, the ceramic fibers, the filler material, and the binder, are all mixed together, and the mixture is subjected to high shear mixing to form a uniformly dispersed slurry. The slurry comprises from about 2.1% to about 7.5% by weight ceramic fibers, from about 0% to about 5.4% by weight filler, from about 18% to about 22% by weight binder and from about 60% to about 80% by weight water. The high shear mixing may be effected in a high speed blender or a propeller mixer, and results in complete dispersion of the fibers, filler and binder.

In addition to the foregoing ingredients, a substance capable of precipitating the binder onto the fibers and filler should be added to the slurry and thoroughly dispersed therein. Actually, the substance agglomerates the binder at the junctures or junction points of the fillers and fibers when activated. The substance should remain stable and ineffective at room temperatures, but when elevated to between 160°F. and 205°F. it should release an agent capable of raising the pH of the slurry to at least 6.5 so as to cause the binder to precipitate onto the fibers and filler particles. Hexamethylenetetramine $(CH_2)_6N_4$, which is often called HMT, is a suitable substance for precipitating the binder, since HMT releases ammonia when heated, and the ammonia will raise the pH of the slurry. This causes gellation of the binder at fiber and filler contacts that is at the junction points of the network.

Aside from the HMT, it is also desirable to add a wetting agent to the slurry to prevent the ceramic fibers from settling and to prevent the filler from floating during subsequent felting. The wetting agent should be volatile at between 800°F. and 1200°F. so that it can be driven from the other materials when heated. Hydroxypropyl cellulose which is sold under the trademark KLUCEL by Hercules, Inc. is a suitable wetting agent.

In any event, while the slurry is mixed with the HMT and the wetting agent, it should have a pH of less than 5.0 and a temperature of about 72° to 76°F.

Once the slurry is thoroughly dispersed it is felted to remove excess binder and to form a semi-rigid block. The felt product which remains has a density greater than the final product, that is the insulation, but is considerably less dense than the slurry. It is further soft and flexible, but possesses enough body to remain free standing when removed from the felting mold.

Vacuum felting constitutes one felting procedure suitable for use in the process, particularly where the final insulation is to be in block form. In vacuum felting, the slurry is contained initially in a retaining column 2 which is located directly above a support column 3 which in turn is located above a manifold 4 having an apertured upper surface or platen 6. The columns 2 and 3 move vertically from separated positions to stacked positions, and in the latter position the support column 3 rests on the manifold platen 6 while the retaining column 2 rests on the support column 3.

The manifold 4 is connected to a sealed sump 8 through a drain line 10, and the drain line 10 has a throttling valve 11 therein to control the vacuum in the manifold 4. The upper end of the sump 8 has a connecting line 12 passing through a cold trap leading to a vacuum pump 13. The vacuum pump 13 is attached to line 12 to induce a vacuum within the sump 8 and the manifold 4 when energized. In addition, there is provided a felting mold 14 having imperforate sidewalls 16 and a wire or fibrous glass mesh 18 across its bottom, and this mold is sized to fit entirely within the support column 3 with its mesh against the apertured platen 6 of the manifold 4. The mesh 18 should have from about 6 to about 20 openings per lineal inch.

In use, the retaining column 2 is initially in its upper position, that is the position in which it is separated from support column 3. The mold 14, on the other hand, is placed within the support column 3 which in turn is placed on the platen 6 of the manifold 4 directly beneath the retaining column 2. Once the column 3 is aligned with the column 2, the latter is lowered andd indeed forced against the upper edge of the support column 3 to form a fluid-tight seal therewith, and this in turn forces the support column 3 tightly against the platen 6 of the manifold 4 to form another fluid-tight seal at that juncture. Next, enough slurry is introduced into the retaining column 2 to fill the mold 14 and a vacuum is produced in the sump 8 and manifold 4. The vacuum is controlled at the throttle valve 11 and should be such that approximately a 10 psi pressure differential exists across the slurry in the mold 14. This pressure differential forces excess binder into the manifold 4 and thence into the sump 8 where it is collected. The soft felt remains in the mold 14.

Where the fibrous insulation is to have a cylindrical or conical shape or some other shape of circular cross-section, circumferential felting is more suited for forming such shapes than is vacuum felting. In circumferential felting the slurry is introduced into the interior of a hollow spindle 20 having apertures 22 opening outwardly from the hollow interior thereof. Surrounding the spindle 20 is a mold 24 which includes a screen 26 in the shape the insulation is to assume. The mold 24 also includes a pair of end plates 28 and 30 which close the ends thereof, that is the annular areas between the ends of the screen 26 and the spindle 20. Where conical shapes are desired, the spindle 20 should be tapered to conform generally to the shape of the screen 26. The spindle 20 and mold 24 are rotated in unison and at the same velocity, and the rotation causes the slurry to flow outwardly through the apertures 22 in the spindle under the influence of centrifugal force. The angular velocity of the mold should be such that about a 10 psi pressure differential is created across its screen 26. The major portion of the slurry collects on the interior surface of the screen 26, while the excess binder flows through the screen 26. The end results is a soft felt of annular cross-section.

After the soft felt is formed, it is released from its mold 14 or 24, whatever the case may be, and placed in a plastic bag which is then sealed. The felt and bag in which it is contained are next placed in a conventional oven where the felt is heated to between about 160°F. and about 205°F. and preferably to about 200°F. Within that temperature range, which is below the boiling point of water, the hexamethylenetetramine (HMT) volatilizes and furthermore decomposes. One of the products resulting from the decomposition is ammonia. This ammonia raises the pH of the water solution within the felt and causes the binder to precipitate or agglomerate on the ceramic fibers and the fillers. While some of the water evaporates during this heating, the plastic bag prevents excessive evaporation so that most of the water remains in the felt. At this juncture the felt is completely free of the organic HMT.

Other substances such as ammonium hydroxide $NH_4(OH)$ may be used in lieu of HMT to precipitate the binder. Precipitation may also be effected by bubbling ammonia gas through the soft felt.

Once the binder has been precipitated, the soft felt is placed in a microwave oven, the frequency of which is compatible with water (about $2.0 \times 10^9$ hertz) so that water within the felt is instantly vaporized. Moreover, the microwave oven heats all the water within the felt uniformly and therefore the water at the center of the felt evaporates along with the water at the exterior surfaces. This prevents any significant displacement or migration of the binder during the heating so that when the felt has dried the density of the binder will be about the same in the center as it is at the exposed surfaces. This should be contrasted to cures in conventional ovens which provide a heated atmosphere. In these ovens the heating occurs from the exposed surfaces inwardly and due to the insulative qualities of the felt, a substantial temperature gradient exists in the felt for much of the oven cure. This in turn causes the water to move outwardly so that the evaporation takes place generally along the exposed surface of the felt only. As a result the binder migrates outwardly with the water leaving the felt with a crust of binder along its exterior surface and inadequate binder at its center. This unequal distribution of the binder adversely affects the structural qualities of the insulation. Thus, the main advantage of the microwave oven cure is that it prevents binder migration.

The oven cure drives most of the water from the felt, leaving a fibrous block or annulus. The block or annulus is then fired at between about 2300°F. and about 3200°F. for about 1 to about 3 hours to increase its strength. If the binder at the outset of the process contains some organic components, the oven cure pyrolyzes the organic components, leaving pure silica at the bonds. Thus, when hydrolyzed ethyl silicate is used as the binder in lieu of colloidal silica, it is converted into silica during the firing. Where the insulation is to be subjected to sustained heating at high temperatures, such as in a furnace, the firing may be omitted, for it will take place once the insulation has been installed. In other words, the fibrous material may be fired in situ.

However, where a silicone binder is used to provide the insulation with ablative properties as well as insulative properties, the firing should be omitted altogether to avoid pyrolyzing the binder prematurely.

Finally, the block or annulus of insulation is machined to the desired shape and size. Such machining may involve sawing, grinding, and sanding, but grinding is preferred since the cutting tools used in most other forms of machining dull rapidly. The block can be machined using diamond air tools without any additional cooling fluid, and the tool life is quite long.

The fibrous insulative materials are very uniform both in density and strength from felt to felt and within each felt. The density is lower than that of typical commercial block insulation. The material will have uniform strength when trimmed due to the absence of soft centers that are associated with most commercial block insulation. This additional strength over commercial block insulations provides greater flexibility in handling, cutting to size and designing larger pieces.

The fibrous insulative material of this invention is capable of withstanding extremely high temperatures without degradation or shrinkage. For example, where mullite is the fibrous material, the insulation can withstand temperatures of up to about 2500°F. without affecting its physical properties. Where zirconia forms the fibrous material, it can withstand 3200°F. The density of the material is quite low ranging between about 10 and about 38 lbs./ft.$^3$. Notwithstanding its fibrous nature and low density, the material is relatively strong, having a compressive strength between 50 and 300 psi. Moreover, the insulation is unaffected by water and most vibrations.

The insulation is ideally suited for furnace lining since it can withstand thermal shock, that is rapid variations in temperature, without degradation. Conventional ceramic liners tend to crack and spall when subjected to rapid fluctuations in temperature. Moreover, because of its low density and low thermal conductivity the insulation does not absorb large quantities of heat. Thus, when the insulation is used in furnace construction heat lost through furnace walls and the heat-up and cool-down rates for such furnaces are greatly reduced. These properties result in savings in fuel costs.

Aside from the foregoing, the insulation when bonded to metal supporting structures does not develop excessive strain at the bondline, even when subjected to extremely high temperatures at its opposite surface. The fibrous network prevents such strains from developing. This characteristic coupled with the extremely low density and relatively high compressive strength makes the insulation ideally suited for use in the re-entry heat shields of spacecraft.

EXAMPLE NO. 1

The following batch ingredients were mixed in a high shear mixer to form a typical slurry:

| Amounts | Ingredients |
|---|---|
| 120 gm. | Mullite fiber |
| 60 gm. | Eccospheres-SI (95% by weight silica product manufactured by Emerson-Cummings, Inc.) |
| 2000 ml. | Colloidal Silica Binder |
| 1 gm. | Klucel (Hydroxypropyl cellulose manufactured by Hercules, Inc. |
| 8.75 gm. | Hexamethylenetetramine |

Sixteen batches of the foregoing formulation were made and the slurry was then poured into a mold and felted to a thickness of 4.5 ± ½ inches and was vacuum felted at a pressure differential of 10 psi for 45 seconds. The base of the mold was wire or mesh having 12 openings per lineal inch. This produced a soft, wet felt having a density of 27 ± 2 lbs./ft.$^3$.

The felt was removed from the mold and placed in a plastic bag wherein it was heated to 200°F. Thereafter, the felt was placed in a microwave oven where for 30 minutes it was subjected to microwave energy having a frequency 2.0 × 10$^9$ hertz. Then the block of material was fired at 2300°F. for 60 to 180 minutes. The firing time varies proportionately with the size of the block.

The insulation formed had a coefficient of thermal conductivity of $$1.5 \frac{BTU-IN}{HR-°F.Ft.^2}$$

and could withstand temperatures up to 2500°F. for 10 hours without extensive deterioration or loss of rigidity. It could further withstand thermal cycling and rapid changes in temperature without significant shrinkage, cracking, or spalling. Its final density was 15.0 ± 1 lbs./ft.$^3$ and its compressive strength was 225 psi.

EXAMPLE NO. 2

In the following batch of ingredients aluminosilicate is the ceramic fiber utilized in the formulation.

| Amounts | Ingredients |
|---|---|
| 120 gm. | Aluminosilicate Fibers |
| 60 gm. | Eccospheres-SI (95% by weight silica product manufactured by Emerson-Cummings, Inc.) |
| 2000 ml. | Colloidal Silica Binder |
| 1 gm. | Klucel (Hydroxypropyl cellulose manufactured by Hercules, Inc.) |
| 8.75 gm. | Hexamethylenetetramine |

The process used in Example No. 1 was followed except that the mesh base of the felting mold had 6 to 15 openings per lineal inch. After the block was formed it was fired at 2300°F. for 60 minutes to produce an insulative material that could withstand temperatures up to 2200°F. for 10 hours without extensive deterioration or loss of rigidity. Its final density was 15 lbs./ft.$^3$ and its compressive strength was 200 psi.

EXAMPLE NO. 3

In the following batch of ingredients zirconia is the ceramic fiber utilized in the formulation.

| Amounts | Ingredients |
|---|---|
| 120 gm. | Zirconia Fibers |
| 0 gm. | Eccospheres-SI (95% by weight silica product manufactured by Emerson-Cummings, Inc.) |
| 2000 ml. | Colloidal Silica Binder |
| 1 gm. | Klucel (Hydroxypropyl cellulose manufactured by Hercules, Inc.) |
| 8.75 gm. | Hexamethylenetetramine |

The process used in Example No. 1 was followed except that the mesh base of the felting mold had 20 openings per lineal inch. After the block was formed it was fired at 3200°F. for 60 minutes to produce an insulative material that could withstand temperatures up to 3100°F. for 10 hours without extensive deterioration or loss of rigidity. Its final density was 38 lbs./ft.$^3$ and its compressive strength was 75 psi.

EXAMPLE NO. 4

In the following batch of ingredients silica is the ceramic fiber utilized in the formulation.

| Amounts | Ingredients |
| --- | --- |
| 120 gm. | Silica Fibers |
| 60 gm. | Eccospheres-SI (95% by weight silica product manufactured by Emerson-Cummings, Inc.) |
| 4000 ml. | Colloidal Silica Binder |
| 1 gm. | Klucel (Hydroxypropyl cellulose manufactured by Hercules, Inc.) |
| 8.75 gm. | Hexamethylenetetramine |

The process used in Example No. 1 was followed except that the mesh base of the felting mold had 6 openings per lineal inch. After the block was formed it was fired at 2300°F. for 60 minutes to produce an insulative material that could withstand temperatures up to 2000°F. for 20 hours without extensive deterioration or loss of rigidity. Its final density was 15 lbs./ft.³ and its compressive strength was 200 psi.

EXAMPLE NO. 5

In the following batch of ingredients aluminosilicatechromia is the ceramic fiber utilized in the formulation.

| Amounts | Ingredients |
| --- | --- |
| 120 gm. | Aluminosilicate-chromia Fibers |
| 60 gm. | Eccospheres-SI (95% by weight silica product manufactured by Emerson-Cummings, Inc.) |
| 2000 ml. | Colloidal Silica Binder |
| 1 gm. | Klucel (Hydroxypropyl cellulose manufactured by Hercules, Inc.) |
| 8.75 gm. | Hexamethylenetetramine |

The process used in Example No. 1 was followed except that the mesh base of the felting mold had 20 openings per lineal inch. After the block was formed it was fired at 2300°F. for 60 minutes to produce an insulative material that could withstand temperatures up to 2100°F. for 10 hours without extensive deterioration or loss of rigidity. Its final density was 15 lbs./ft.³ and its compressive strength was 200 psi.

EXAMPLE NO. 6

In the following batch of ingredients mullite is the ceramic fiber utilized in the formulation.

| Amounts | Ingredients |
| --- | --- |
| 120 gm. | Mullite Fibers |
| 60 gm. | Aluminosilicate Spheres (Mullite composition) |
| 2000 ml. | Colloidal Silica Binder |
| 1 gm. | Klucel (Hydroxypropyl cellulose manufactured by Hercules, Inc.) |
| 8.75 gm. | Hexamethylenetetramine |

The process used in Example No. 1 was followed except that the mesh base of the felting mold had 10 openings per lineal inch. After the block was formed it was fired at 2300°F. for 60 minutes to produce an insulative material that could withstand temperatures up to 2250°F. for 10 hours without extensive deterioration or loss of rigidity. Its final density was 17 lbs./ft.³ and its compressive strength was 140 psi.

EXAMPLE NO. 7

The following batch ingredients were mixed in a high shear mixer to form a slurry without the presence of a filler material.

| Amounts | Ingredients |
| --- | --- |
| 2400 gm. | Mullite Fiber |
| 40 l. | Colloidal Silica Binder |

The slurry was poured into a mold and felted to a thickness of 4.0 inches and was vacuum felted at a pressure differential of 10 psi for 45 seconds. The base of the mold was wire or mesh having 10 openings per lineal inch. This produced a soft, wet, felt having a density of about 31 lbs./ft³.

The felt was removed from the mold and placed in a plastic bag wherein it was heated to 190°F. Thereafter, the felt was placed in a microwave oven for 30 minutes subject to mircowave energy having a frequency of 2.0 × 10⁹ hertz. The block of material was fired at 2300°F. for 60 minutes.

The insulation so formed had a coefficient of thermal conductivity of $$1.2 \; \frac{BTU-IN}{HR-°F.Ft.^2}$$

and could withstand temperatures up to 2300°F. for 25 hours without extensive deterioration or loss of rigidity. This composition had less shrinkage than the insulation material utilizing filler materials. It also didn't crack or spall. Its final density was 16 lbs./ft.³ and its compressive strength was 190 psi.

This invention is intended to cover all changes and modifications of the examples of the invention herein chosen for purposes of the disclosure which do not constitute departures from the spirit and scope of the invention.

What is claimed is:

1. A process for making a fibrous insulation, said process comprising forming a slurry containing by weight about 2.1% to about 7.5% ceramic fibers, about 18% to about 22% colloidal silica binder which is capable of forming a ceramic when fired, not more than about 5.4% ceramic filler, and about 60% to about 80% water; felting the slurry to form a soft felt in which the fibers cross at junction points; precipitating the binder onto the fibers and filler by mixing into the slurry hexamethylenetetramine which generates ammonia at between about 160°F. and 205°F. and heating the soft felt to between about 160°F. and 205°F. for about 60 to about 120 minutes to generate the ammonia so as to elevate the pH of the liquid within the felt to at least about 6.5 and thereby cause the binder to concentrate and gel at the junction points, said heating to between 160°F. and 205°F. being in an enclosure to prevent excessive evaporation of liquid from the soft felt; thereafter subjecting the soft felt to microwave energy to dry the felt; and firing the felt to increase its strength.

2. A process for making a light weight fibrous insulation having a density between approximately 10 lbs./ft.³ and 38 lbs./ft.³, said process comprising: forming a slurry containing by weight about 2.1% to about 7.5% ceramic fibers, about 18% to about 22% colloidal silica binder which is capable of forming a ceramic when fired, no more than about 5.4% ceramic filler of a granular nature, and about 60% to about 80% water; felting the slurry to form a soft felt in which some fibers cross over other fibers to create a network having interstices in which the granules of the filler generally locate and wherein the crossing fibers and the fillers form junction points; causing the binder to concentrate at the junction points and to gel at the junction points by introducing into the soft felt enough ammonia gas to elevate the pH of the liquid within the felt to at least about 6.5; and subjecting the felt to microwave energy to dry the felt such that the drying is substantially uniform throughout so as to prevent the binder from migrating to the surface of the felt.

3. The process according to claim 2 wherein the slurry further contains a wetting agent which prevents the ceramic fibers from settling.

4. A process according to claim 2 wherein the fibers are selected from the group consisting of mullite, aluminosilicate, zirconia, silica, and chromia.

5. A process according to claim 2 wherein the dried felt is fired at a temperature between about 2300°F. and 3200°F.

6. An insulative material comprising: ceramic fibers disposed in a random network such that some of the fibers cross over other fibers, creating interstices in the network; a granular ceramic filler with the granules thereof being in the interstices of the network, whereby the crossing fibers and the fillers form junction points in the network; and a binder concentrated at the junction points of the fibrous network and holding the fibers and the granules of the filler in place, the binder being silica; the insulative material having a density between approximately 10 lbs./ft.³ and 38 lbs./ft.³ with the fibers constituting between approximately 20% and 80% of the weight of the material, the binder between approximately 10% and 40%, and the granular filler not more than approximately 50%.

7. An insulative material according to claim 6 wherein the ceramic fibers are selected from the group consisting of mullite, aluminosilicate, silica, zirconia, and aluminosilicate-chromia.

8. An insulative material according to claim 6 wherein the granular filler includes hollow spheres of a material selected from the group consisting of silica, aluminosilicate, and zirconia.

* * * * *